United States Patent
Bilodeau (10) Patent No.: US 11,723,755 B2
(45) Date of Patent: Aug. 15, 2023

(54) DROP-SHAPED SCREW CONDUIT FOR A DENTAL SUPERSTRUCTURE AND DESIGNING METHOD THEREOF

(71) Applicant: PANTHERA DENTAL INC., Quebec (CA)

(72) Inventor: Jean-Pierre Bilodeau, Beaumont (CA)

(73) Assignee: Panthera Dental Inc., Quebec (CA)

( * ) Notice: Subject to any disclaimer, the term of this patent is extended or adjusted under 35 U.S.C. 154(b) by 670 days.

(21) Appl. No.: 16/603,412

(22) PCT Filed: Apr. 6, 2018

(86) PCT No.: PCT/CA2018/050430
§ 371 (c)(1),
(2) Date: Oct. 7, 2019

(87) PCT Pub. No.: WO2018/184119
PCT Pub. Date: Oct. 11, 2018

(65) Prior Publication Data
US 2020/0038148 A1    Feb. 6, 2020

Related U.S. Application Data

(60) Provisional application No. 62/482,922, filed on Apr. 7, 2017.

(51) Int. Cl.
*A61C 8/00* (2006.01)
(52) U.S. Cl.
CPC .................. *A61C 8/0068* (2013.01)
(58) Field of Classification Search
CPC ..... A61C 8/0068; A61C 8/0048; A61C 8/005; A61C 8/0051; A61C 8/0053;
(Continued)

(56) References Cited

U.S. PATENT DOCUMENTS 5,116,225 A * 5/1992 Riera ............. A61C 8/005
433/173
5,662,474 A * 9/1997 Jorneus ............. A61C 8/005
433/172
(Continued)

FOREIGN PATENT DOCUMENTS

WO      2013050796 A1    4/2013

OTHER PUBLICATIONS

International Search Report of PCT/CA2018/050430 dated Jun. 21, 2018, 3 pages.
(Continued)

*Primary Examiner* — Nicholas D Lucchesi
*Assistant Examiner* — Hao D Mai
(74) *Attorney, Agent, or Firm* — Brooks Kushman P.C.

(57) ABSTRACT

A dental superstructure securable to a protruding dental abutment, related assembly and method of design are provided. The dental superstructure is designed to mimick a tooth and is perforated to create a drop-shaped screw conduit for screw insertion and advancement. The screw conduit includes an insertion portion extending substantially conically outwardly from an inlet to enable advancement of an inserted screw along an insertion axis and a spherical angulation portion extending from and communicating with the insertion portion to allow angulation of the screw from the insertion axis to an implant axis. Buccal and/or lingual contours of the screw conduit may be respectively arched outwardly and inwardly from the insertion axis to adapt to screw advancement needs. The dental superstructure may be part of an assembly for a dental implant in combination with an osseointegrable implant including the protruding dental abutment; and a dental abutment screw.

17 Claims, 7 Drawing Sheets

(58) Field of Classification Search
CPC ... A61C 8/0054; A61C 8/0056; A61C 8/0063; A61C 8/0066; A61C 8/0069; A61C 8/0072
See application file for complete search history.

(56) References Cited

U.S. PATENT DOCUMENTS

| | | | | |
|---|---|---|---|---|
| 10,149,741 B2* | 12/2018 | Haus | ............ | A61C 8/0068 |
| 2003/0162149 A1* | 8/2003 | Bjorn | ............ | A61C 8/005 |
| | | | | 433/173 |
| 2008/0311544 A1* | 12/2008 | Lee | ............ | A61C 8/0068 |
| | | | | 433/173 |
| 2010/0297583 A1* | 11/2010 | Benzon | ............ | A61C 8/005 |
| | | | | 433/174 |
| 2011/0217675 A1* | 9/2011 | Farre Berga | ............ | A61C 8/0089 |
| | | | | 433/172 |
| 2012/0246916 A1* | 10/2012 | Farre Berga | ............ | A61C 8/005 |
| | | | | 29/700 |
| 2014/0065574 A1* | 3/2014 | Benzon | ............ | A61C 13/34 |
| | | | | 433/173 |
| 2014/0154643 A1* | 6/2014 | Benzon | ............ | A61C 8/0068 |
| | | | | 433/173 |
| 2014/0186797 A1* | 7/2014 | Haus | ............ | A61C 8/008 |
| | | | | 433/173 |
| 2014/0349250 A1* | 11/2014 | Elsner | ............ | A61C 8/0051 |
| | | | | 433/174 |
| 2015/0056569 A1* | 2/2015 | Regev | ............ | A61C 8/0018 |
| | | | | 433/80 |
| 2016/0022390 A1* | 1/2016 | Spindler | ............ | A61C 8/0068 |
| | | | | 433/167 |
| 2016/0081772 A1* | 3/2016 | Schweiger | ............ | A61C 8/0068 |
| | | | | 433/173 |
| 2016/0151127 A1* | 6/2016 | Simmonds | ............ | A61C 8/0089 |
| | | | | 433/201.1 |
| 2017/0105819 A1* | 4/2017 | Ekstrom | ............ | A61C 8/0048 |
| 2017/0105820 A1* | 4/2017 | Aravena | ............ | A61C 8/0068 |
| 2017/0202649 A1* | 7/2017 | Bernhard | ............ | A61C 8/0062 |
| 2017/0224447 A1* | 8/2017 | Richard | ............ | A61C 8/0069 |
| 2019/0021824 A1* | 1/2019 | Xam-Mar Mangrane | ............ | A61C 13/0006 |
| 2019/0038418 A1* | 2/2019 | Eliopoulos | ............ | A61C 8/0025 |
| 2019/0247165 A1* | 8/2019 | Mullner | ............ | G06F 30/00 |
| 2019/0298498 A1* | 10/2019 | Spindler | ............ | A61C 8/006 |
| 2020/0046468 A1* | 2/2020 | Pappas | ............ | A61C 8/0059 |
| 2020/0093578 A1* | 3/2020 | Spindler | ............ | A61C 8/0022 |

OTHER PUBLICATIONS

Written Opinion of PCT/CA2018/050430 dated Jun. 21, 2018, 5 pages.

* cited by examiner

DROP-SHAPED SCREW CONDUIT FOR A DENTAL SUPERSTRUCTURE AND DESIGNING METHOD THEREOF

CROSS-REFERENCE TO RELATED APPLICATION

This application is the U.S. national phase of International Application No. PCT/CA2018/050430 filed on Apr. 6, 2018 which claims the benefit of U.S. provisional Patent Application No. 62/482,92.2 filed on Apr. 7, 2017, the disclosures of which are incorporated in their entirety by reference herein.

TECHNICAL FIELD

The present invention generally relates to implantology, and more particularly to a dental superstructure including a drop-shaped screw conduit and a method for conception thereof.

BACKGROUND

In the field of oral implantology, various ways of implanting alloplastic materials to replace endogenous teeth functions are provided with the objective of bio-integration. To replace a defective tooth, a dental restoration is retained proximate the jaw bone of a patient by a dental implant which can be an intra-ossal implant directly anchored in the bone.

In a first example, a dental restoration can be referred to as a dental superstructure which is fixed and implant-retained as a crown (one-tooth replacement) or a bridge (multiple-teeth replacement). In another example, a dental superstructure can be combined to natural abutment teeth which are connected to one or several implants.

Anchoring the dental superstructure to the dental implant to ensure bio-integration and fulfill esthetic requirements presents various challenges that still need to be addressed.

SUMMARY

Implementations of a dental superstructure, and methods related thereto, respond to the above needs by providing a screw conduit being angulated to reduce visibility thereof from outside the oral cavity and having a drop-like shape to allow freedom of angulation for the screw during fixation thereof.

In one aspect, there is provided a dental superstructure securable to a protruding dental abutment. The dental superstructure includes an implant screw conduit defining an implant axis and a base structure mimicking a tooth and being perforated to create a path for a screw towards the protruding dental abutment. The path defines within the base structure a drop-shaped screw conduit having:
   an aperture defining an inlet on an external surface of the base structure to enable insertion of the screw into the drop-shaped screw conduit,
   an insertion portion extending conically outwardly from the inlet to enable advancement of the screw along an insertion axis, and
   an angulation portion extending from and communicating with the insertion portion and having a substantially spherical contour to allow angulation of the screw from the insertion axis to the implant axis.
In some implementations, the dental superstructure includes a screw abutment seat extending from the drop-shaped screw conduit to receive the screw, the screw abutment seat being sized and configured to be abutted by an head of the screw inserted within the protruding dental abutment along the implant axis.

In some implementations, the dental superstructure includes a secondary screw conduit extending downwardly from the screw abutment seat along the implant axis. The secondary screw conduit is in communication with the implant screw conduit extending from a distal end of the protruding dental abutment downwardly towards a jaw bone of a patient.

In some implementations, the dental superstructure includes an abutment recess extending upwardly from a base portion of the base structure up to the secondary screw conduit and defining a secondary abutment seat offering an abutment surface to the protruding dental abutment, the abutment recess being substantially complementary in shape with a shape of the protruding dental abutment.

In some implementations, the insertion portion of the dental superstructure has a buccal surface which is outwardly arched with respect to the insertion axis to define an extended angulation space for angulation of the screw. Optionally, a distance R between a point of the buccal surface and the insertion axis has a maximum value in accordance with a head diameter of the screw. Further optionally, a location of the point of the buccal surface at which the distance R has the maximum value is in accordance with a length of the screw.

In some implementations, the insertion portion of the dental superstructure has a lingual surface which is inwardly arched with respect to the insertion axis to create an extended dental space for the dental superstructure. Optionally, a distance r between a point of the lingual surface and the insertion axis has a minimum value follows the equation:

$$r_m = R_1 - 0.05 \text{ mm}$$

wherein $r_m$ is the minimal value of the distance r, and $R_1$ is the radius of the inlet of the screw conduit.

In some implementations, the base structure of the dental superstructure has a lingual external surface and the aperture of the inlet is located on the lingual external surface.

In some implementations, the insertion and the implant axes are aligned and the secondary and the implant screw conduits are concentric.

In another aspect, there is provided an assembly for a dental implant, the assembly including:
   a dental superstructure as defined herein;
   an osseointegrable implant including the protruding dental abutment; and
   a dental abutment screw;
   the osseointegrable implant being securable to a jaw bone, and the dental superstructure being mountable about the protruding dental abutment by inserting the screw through the drop-shaped screw conduit of the dental superstructure and screwing the screw into the osseointegrated implant.

In another aspect, there is provided a method for designing a drop-shaped screw conduit of a dental superstructure securable to a protruding dental abutment with a screw having a head. The method includes:
   designing an inlet of the drop-shaped screw conduit, the inlet having a first diameter D1 in accordance with a diameter of the head of the screw to be inserted in the drop-shaped screw conduit along an insertion axis;
   designing an insertion portion of the drop-shaped screw conduit, the insertion portion extending substantially conically outwardly from the inlet for advancement of the screw along the insertion axis; and designing an angulation portion of the drop-shaped screw conduit, the angulation portion having a substantially spherical contour defined by:
- a second diameter D2 larger than the first diameter D1 of the inlet to allow angulation of the screw from the insertion axis to an implant axis, and
- an angulation center positioned with respect to the dental superstructure at the intersection of the insertion axis and the implant axis.

In some implementations, the method further includes designing a screw abutment seat which is configured to receive the head of the screw in abutment when screwed in the protruding dental abutment along the implant axis.

In some implementations, designing the angulation portion comprises determining the second diameter according to the following equation (I):

$$D2 = D1 + x \tag{I}$$

wherein D2 is the second diameter; D1 is the first diameter and x is between 0 and 1.5. Optionally, x=0.75.

In some implementations, designing the angulation portion comprises positioning the angulation center at an angulation height which is greater that an abutment height at which the screw abuts to the screw abutment seat. Optionally, positioning the angulation center comprises determining the angulation height for a screw head having a flat seat according to the following equation (II):

$$H2 = H1 + \frac{D2}{2} \tag{II}$$

wherein H2 is the angulation height; H1 is the abutment height; and D2 is the second diameter of the angulation portion.

Further optionally, positioning the angulation center comprises determining the angulation height for a screw head having a tapered seat according to the following equation (III):

$$H2 + H3 + \frac{D2}{2} \tag{III}$$

wherein H2 is the angulation height; H3 is the sum of the abutment height and the tapered screw head height; D2 is the second diameter of the angulation portion and D1 is the first diameter in accordance to the inlet of the insertion portion.

In some implementations, designing the screw abutment seat comprises selecting an abutment shape of the screw abutment seat being substantially complementary with a shape of the head of the screw. Optionally, the method includes selecting a tapered shape to complement a tapered seat head of the screw. Alternatively, the method may include selecting a flattened shape to complement a flat seat head of the screw.

In some implementations, the method further includes adjusting a buccal surface of the insertion portion of the screw conduit, the adjustment comprising outwardly arching the buccal surface with respect to the insertion axis to obtain a distance R between a point of the buccal surface and the insertion axis which is higher than a radius R2 (D2/2) of the angulation portion.

In some implementations, the method further includes adjusting a lingual surface of the insertion portion of the screw conduit, the adjustment comprising inwardly arching the lingual surface with respect to the insertion axis to obtain a distance r between a point of the buccal surface (202) and the insertion axis (A) which is lower than a radius R1 (D1/2) of the insertion portion.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

BRIEF DESCRIPTION OF THE DRAWINGS

Implementations of a drop-shaped screw conduit for a dental superstructure are represented in and will be further understood in connection with the following figures.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

Dental implants are artificial roots that can be implemented into the jaw bone of a patient to offer support and a fixation point to a dental superstructure mountable thereon. The dental implant can be understood as including an implant substructure nested in the jawbone and an implant superstructure, also referred to as a protruding dental abutment, that connects to its implant substructure and which is protruding from the jawbone in place of the missing tooth.

A dental superstructure is a visible structure, such as an artificial tooth, that replaces and mimics natural teeth of a patient. The dental superstructure, having a dental shape, can be made of various material including alloys, composite resin, acrylic resin and ceramic.

The dental superstructure is mountable about the protruding dental abutment of the dental implant.

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented in the claims and the specification are not to be construed as limiting but rather as illustrative only.

Moreover, although the embodiments of the dental superstructure and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the dental superstructure as will be briefly explained herein and as can be easily inferred herefrom by a person skilled in the art.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Figure 1:
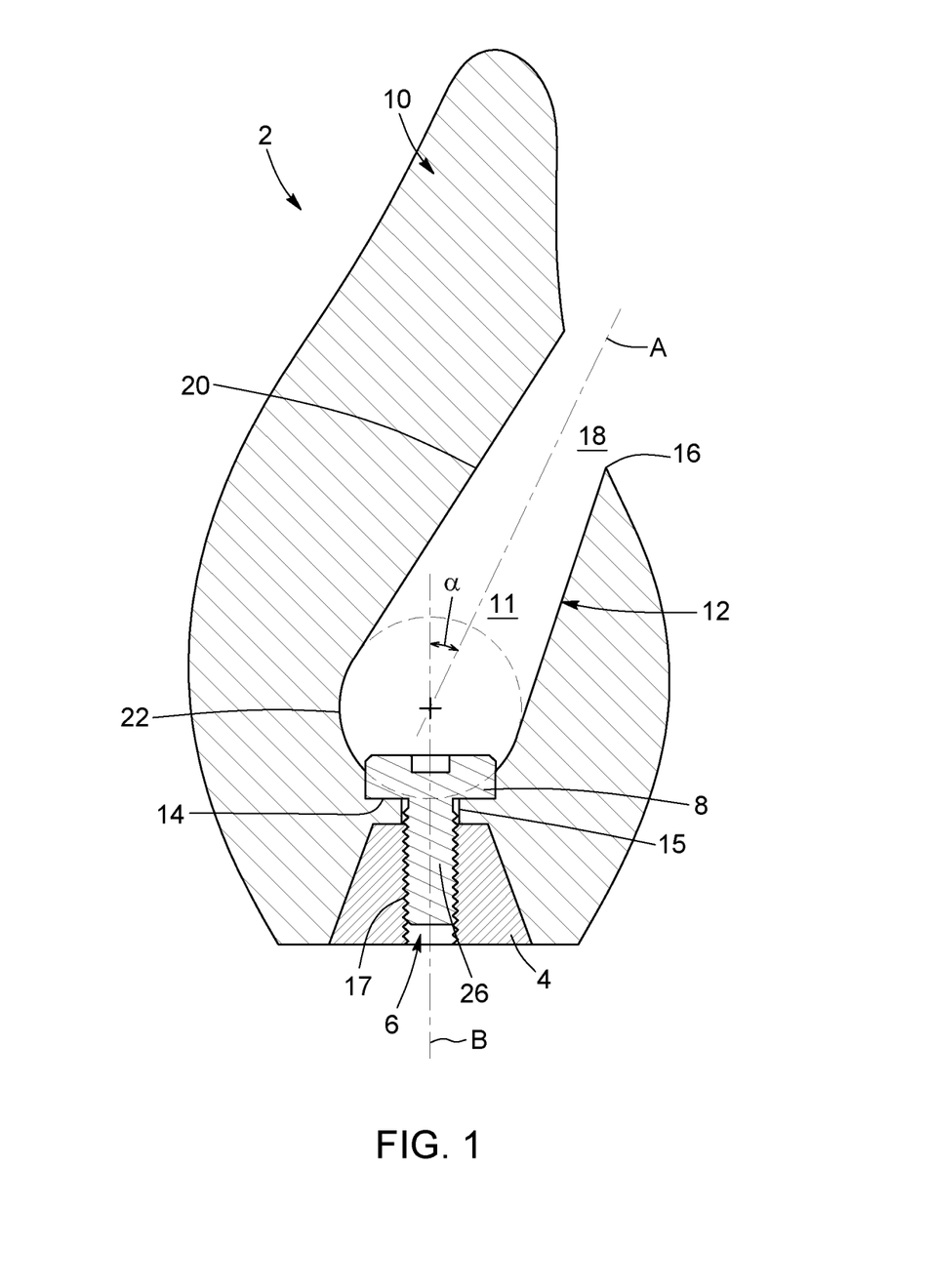
FIG. 1 is a schematic cross-sectional view of a dental superstructure fastened to an osseointegrated dental implant with a flat seat screw, i.e. a screw having a substantially flat abutment seat.

In a first implementation, and as illustrated on FIG. 1, there is provided a dental superstructure (2) that is mountable on a protruding dental abutment (4) by insertion and screwing of a screw (6) through the dental superstructure (2) and within the protruding dental abutment (4). The protruding dental abutment (4) serves as a load-bearing connection member between the implant substructure (not illustrated on FIG. 1) and the dental superstructure (2). Guidance and alignment of the screw (6) along insertion and implant axis (A, B) are enabled by the geometry of a specific path defined in the dental superstructure (2) for the screw. More particularly, the dental superstructure (2) is perforated to define a path for a screw towards the protruding dental abutment (4). In the embodiment shown, the specific path is defined, at least partially, by the shape of a drop-shaped screw conduit formed in the dental superstructure (2).

It should be noted that the screw may refer to a dental abutment screw and may be available in various sizes tailored to the selected protruding dental abutment which has been previously anchored into the jaw bone of the patient. Implementations of the drop-shaped screw conduit of the dental superstructure can be adapted in shape and angle to receive all kinds of dental abutment screw available to one skilled in the art.

Figure 2:
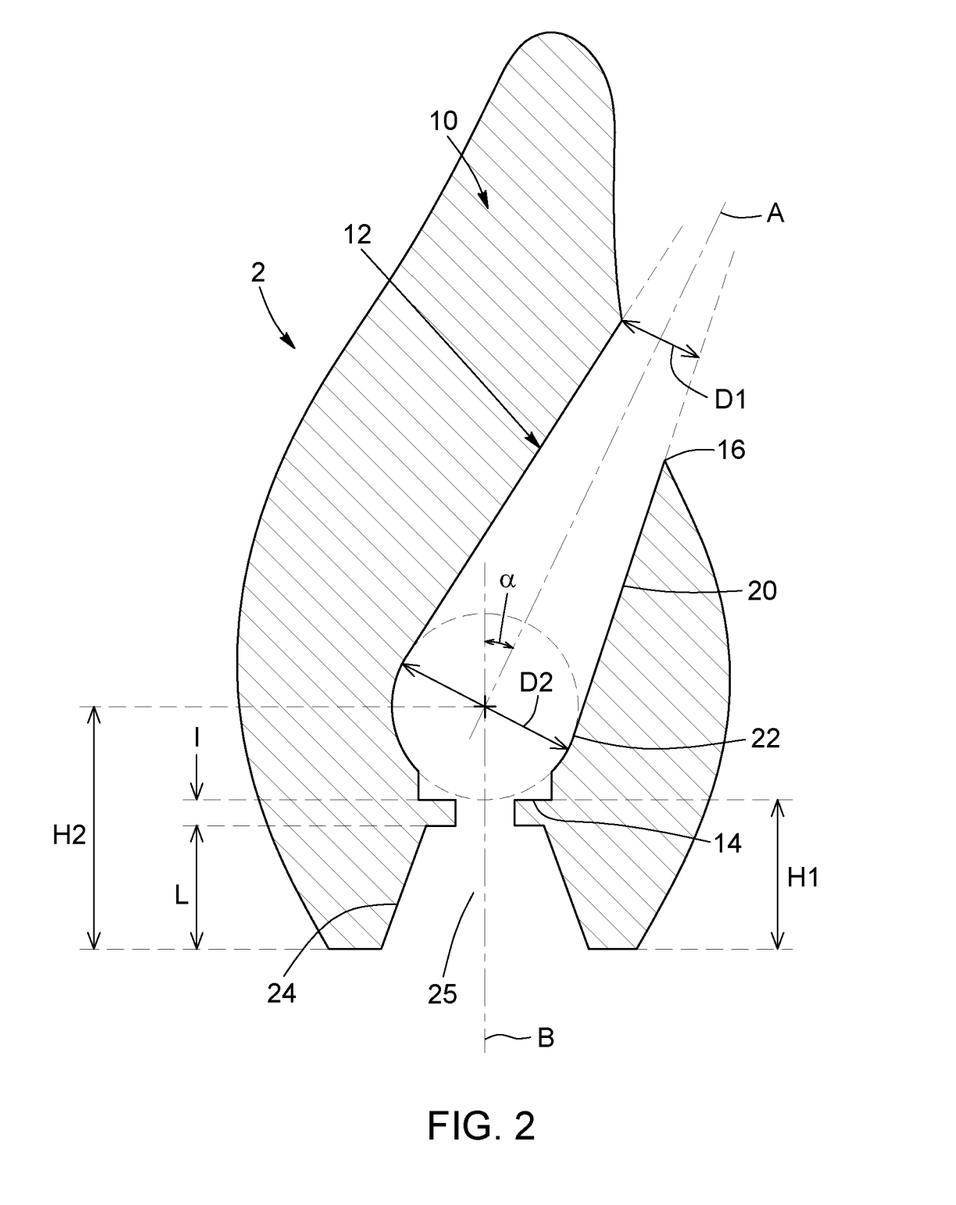
FIG. 2 is a schematic cross-sectional view of a dental superstructure designed for insertion of a flat seat screw.
Figure 3:
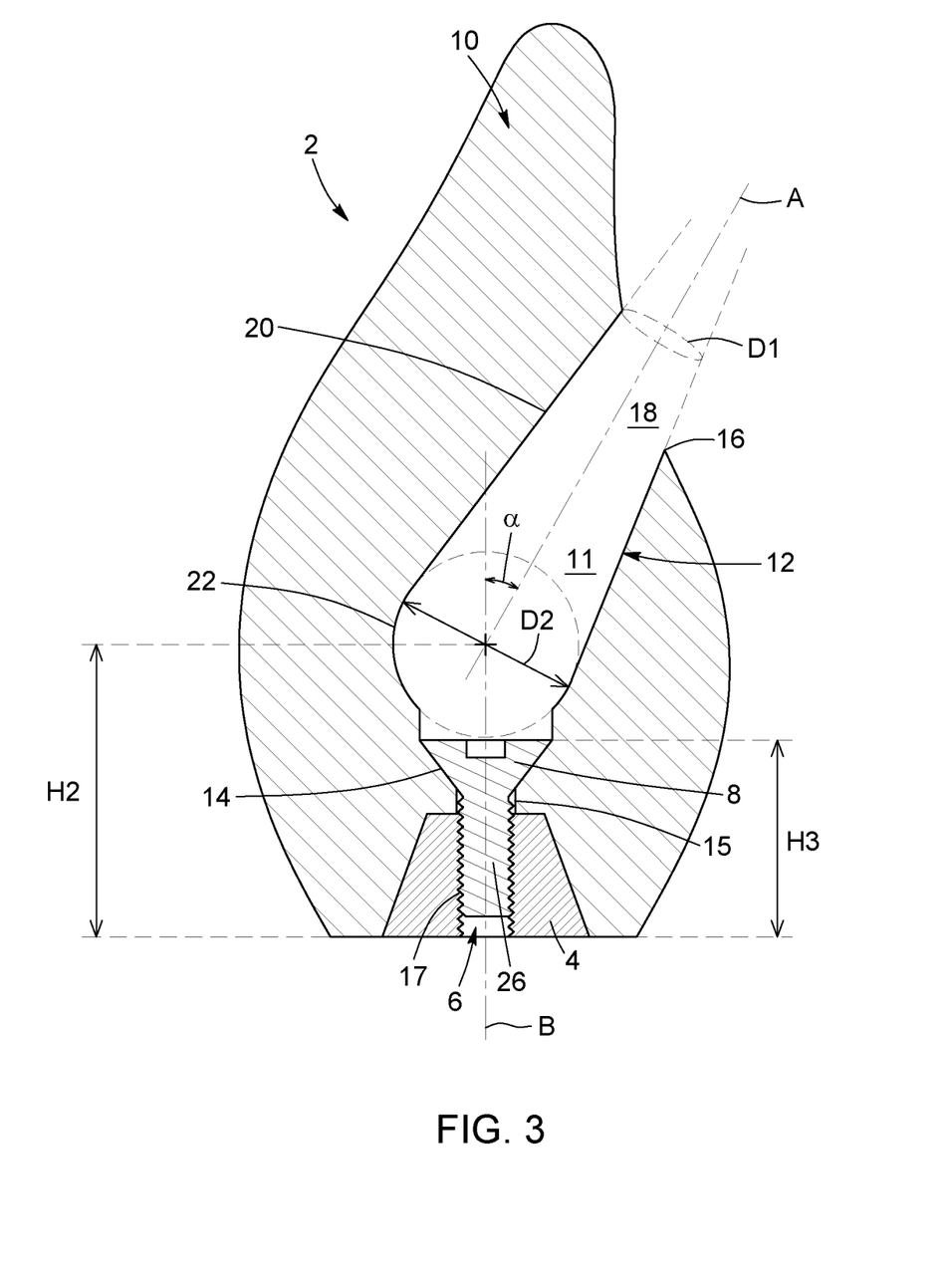
FIG. 3 is a schematic cross-sectional view of a dental superstructure fastened to an osseointegrated dental implant with a countersunk seat screw, i.e. a screw having a tapered abutment seat.
Figure 4:
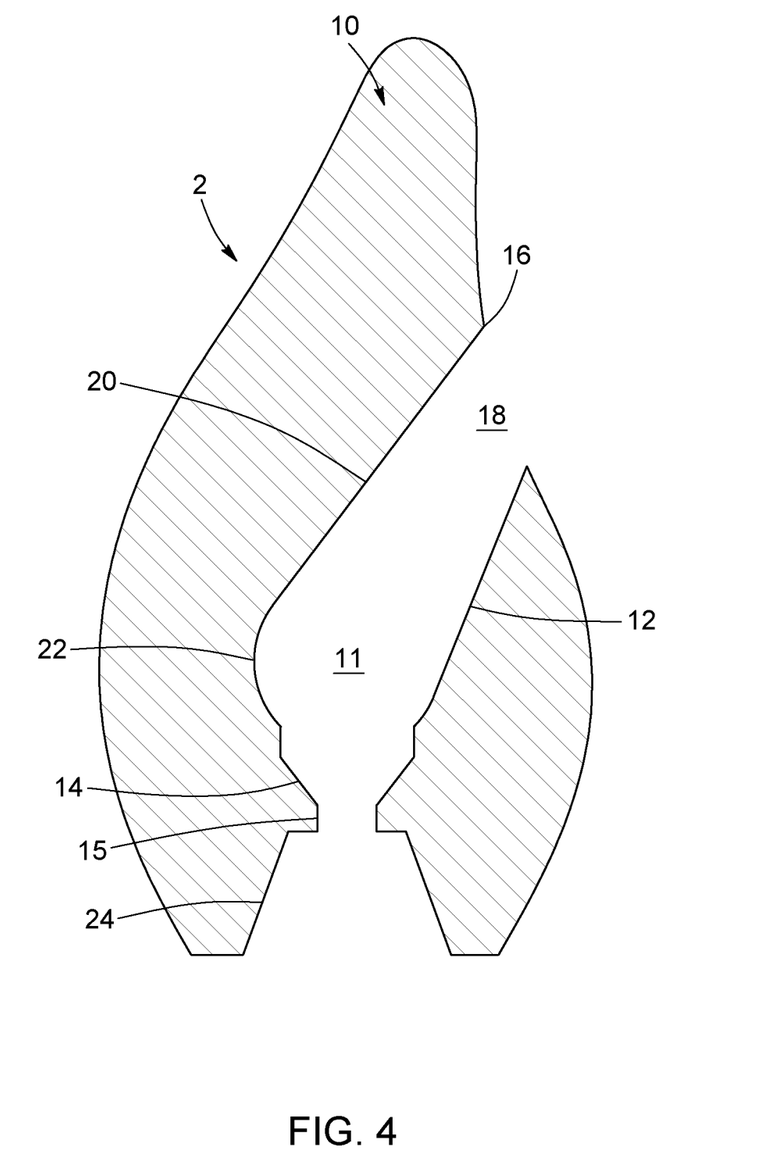
FIG. 4 is another schematic cross-sectional view of a dental superstructure designed for insertion of a tapered seat screw.

Still referring to FIG. 1, the dental superstructure (2) includes a base structure (10) completing the function of tooth substitution, in which a path (11) is formed to allow insertion and advancement of the screw (6) unto the protruding dental abutment (4). The path thereby defines a drop-shaped screw conduit (12) having substantially the shape of a drop, and offering a passage towards the protruding dental abutment (4). The path is further defined a screw abutment seat (14), which is a recess within the base structure (10). The recess forming the screw abutment seat (14) includes at least a portion that is substantially complementary in shape with the geometry of a head (8) of the screw (6), to secure the screw when fully inserted within the protruding dental abutment (4). More particularly, the screw abutment seat (14) is substantially complementary in shape with the geometry of the seat of the screw head (8). The complementary of the recess and the screw head (8) allows for a mechanically stable connection between the implant substructure (not illustrated), the abutment (4) and the superstructure (2). For example, FIGS. 1 and 2 illustrate a recess being complementary with a flat geometry of the screw head (8); and FIGS. 3 and 4 illustrate a recess being complementary with a screw head (8) having a tapered geometry. More particularly, in FIGS. 1 and 2, the recess is a counterbore, i.e. a cylindrical flat-bottomed hole that enlarges another coaxial hole (i.e. a secondary screw conduit (15), as will be described in more details below). The dental superstructure (2) is thus configured to be used in combination with a flat seat screw, i.e. a screw having a flat abutment seat. In FIGS. 3 and 4, the recess is a countersink, i.e. a conical enlargement of another coaxial hole, i.e. the secondary screw conduit (15). The dental superstructure (2) is thus configured to be used in combination with a countersunk seat screw (or tapered seat screw), i.e. a screw having a tapered abutment seat.

It should be noted that the screw conduit as defined herein has contours resembling to the ones of a drop (or truncated drop), thereby being referred to as a drop-shaped screw conduit. One skilled in the art will readily understand that the contours of the drop-shaped screw conduit may vary from those of a perfect drop to adapt to the mimicked tooth geometry and particularities of the oral cavity and/or screw. The substantial shape of a drop enables the screw conduit to have a conduit diameter which is increasing until adequate freedom of movement is given to the screw for an orientation change, whereas the inlet diameter is as small as possible for achieving a discrete and even hidden screw opening within the superstructure.

Figure 7:
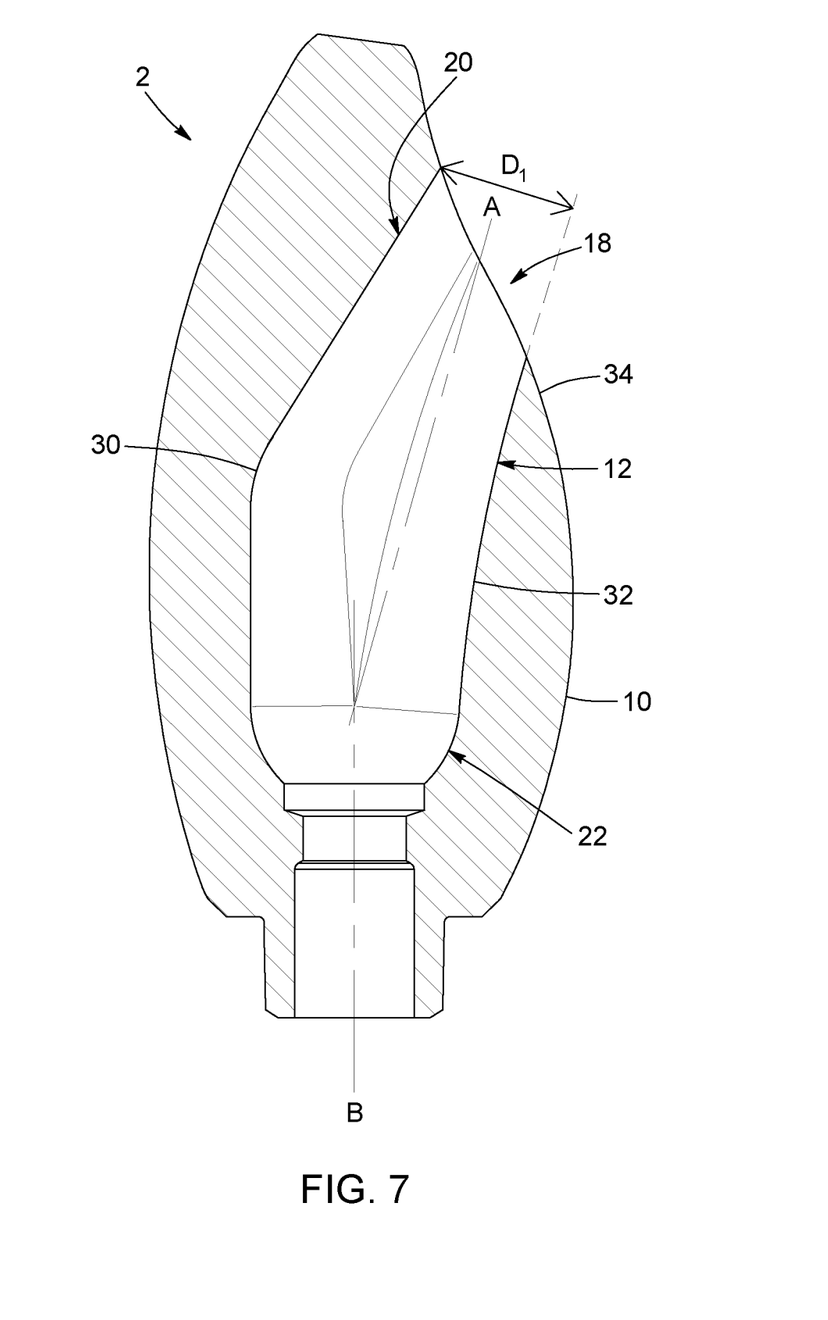
FIG. 7 is a cross-sectional view of a dental superstructure including a screw conduit for insertion of a screw.

In the shown embodiment of FIG. 7 for instance, the base structure (10) comprises a lingual external surface (34) and the inlet of the screw conduit is defined by an aperture (18) which is located about an upper portion of the lingual external surface (34). As one skilled in the art will readily understand, the lingual external surface (34) offers a hidden surface from an outside of the oral cavity which may be suited to enhance esthetical features of the dental superstructure (2). However, the aperture may be perforated about any external surface of the dental super structure depending on the orientation of the implant axis (B) and the insertion axis (A). Advantageously, the screw conduit is oriented at an angle with respect to the implant axis (B), such that an inlet of the screw conduit is not or is less visible from outside of a patient's oral cavity in comparison to traditional superstructures. In addition, the screw conduit offers an adequate angulation space while keeping an inlet aperture in the base structure as small as possible.

More particularly, referring to FIGS. 1 to 3, the insertion axis (A) of the drop-shaped screw conduit (12) is positioned at an angle α with respect to the implant axis (B) of the protruding dental abutment (4).

It should be noted that the angle α may be selected in accordance with the nature of the tooth to be replaced by the corresponding dental superstructure. Indeed, depending on the positioning of the tooth within the jaw, different angles may be used to enable insertion of the screw without being blocked by adjacent teeth. The angle α may also vary to ensure that the inlet of the conduit is situated at a hidden location on an external surface of the base structure. It should be understood that a hidden location may refer to a discrete or non-visible part of the base structure from outside the oral cavity of a patient. In certain implementations, the insertion axis (A) and the implant axis (B) may also be substantially aligned such that the screw conduit (12) is concentrically arranged with respect to an aperture of the protruding dental abutment.

In some implementations, the drop-shaped screw conduit (12) includes first and second portions which are dedicated to insertion and angulation of the screw respectively.

Insertion Portion Implementations

Referring to FIG. 1, the drop-shaped screw conduit (12) has an inlet (16) defining an aperture (18) on an external surface of the base structure (10) to enable insertion of the screw (not illustrated on FIG. 2) into the drop-shaped screw conduit (12). The inlet (16) is optionally of circular or quadric section and has an inlet diameter D1 in accordance with a diameter of the head (8) of the screw (6) to be inserted. The drop-shaped screw conduit (12) further includes an insertion portion (20) enabling advancement of the screw (6) along the insertion axis (A) at an angle α with respect to the implant axis (B). The insertion portion (20) extends conically outwardly from the inlet (16), thereby having substantially the shape of a cone, truncated at a distal end thereof along the external surface of the base structure (10). It should be noted that the term outwardly refers to an increasing distance with respect to the insertion axis and in a downward direction towards the protruding dental abutment (4). It should be further noted that the insertion portion (20) may have a varying diameter increasing from the inlet diameter D1 to an angulation diameter D2. Both length and diameter of the insertion portion (20) are selected in accordance with the diameter and length of the screw to be inserted therein.

It should be further noted that FIGS. 1 to 4 illustrate a screw conduit (12) including an insertion portion (20) with plane contours having a constant slope with respect to the insertion axis (A) so as to define a substantially perfect truncated cone.

However, the insertion portion (20) of the screw conduit (12) may differ and include arched contours so as to define a more rounded drop shape along with the angulation portion (22) of the screw conduit (12), i.e. wherein the slope of the contours of the insertion portion (20) of the screw conduit (12) vary along their length. As readily understood by one skilled in the art, the geometry of the insertion portion (20) of the screw conduit (12) can differ from the exemplary embodiment of FIGS. 1 to 4 in that at least a portion of the insertion portion (20) may further deviate from the insertion axis as will be seen, for example, in FIGS. 5 and 6, so as to offer suitable space to the screw head (8) for rotation when a distal end of the screw (6) is oriented along the implant axis (B) when entering the angulation portion (22).

Angulation Portion Implementations

Still referring to FIG. 1, another portion of the drop-shaped screw conduit (12) may be referred to as an angulation portion (22). The angulation portion (22) extends from the insertion portion (20) and has a substantially spherical contour to enable the screw (6) angulating from the insertion axis (A) to the implant axis (B). The angulation portion (22) of the conduit is configured to enclose a spherical space having the angulation diameter D2.

It should be noted that angulating may therefore refer to the ability for the screw to pivot or rotate within the spherical space and according to the angle α, so as to transition from the insertion axis (A) to the implant axis (B). The angulation diameter D2 corresponds to the diameter of the sphere defining the angulation portion (22). The angulation diameter D2 may be chosen in accordance with the inlet diameter D1 and tailored to the size of the screw to be inserted in the drop-shaped screw conduit (12).

Optional Geometry Implementations

As above mentioned, the screw conduit (12) can have the general shape of a drop which is oriented along the insertion axis (A) for conducting a screw therealong and ultimately secure the corresponding dental superstructure (2) to the jawbone of a patient. In some implementations, the insertion portion (20) of the screw conduit (12) can have contours which depart from the truncated cone shape illustrated in FIGS. 1 to 4. Depending on the shape of the screw head (8) and the length of the inserted screw, more angulation space may be needed so as to enable the screw to be oriented from the insertion axis (A) to the implant axis (B). The angulation portion (22) of the screw conduit (12) may not be sufficient to ensure adequate angulation of the screw.

It should be understood that the term "lingual" is herein used in relation to any surface or location which is near, in contact with or oriented toward the tongue. The term "buccal" is herein used in relation to any surface or location which is near, in contact with or oriented towards the oral cavity (including inner surface of cheeks and mouth). In the embodiments shown of the dental superstructure (2), the aperture (18) of the drop shaped conduit (12) is located on the lingual side of the base structure (10).

In some implementations, the insertion portion (20) may be deformed to accommodate for a higher liberty of movement of the screw, while maintaining integrity of the dental superstructure (2). Deformation refers to a variation in the slope of the contours of the insertion portion (20) along its length, in contrast to an absence of slope variation leading to a perfect truncated cone shape. Deformation of the contours can be tailored to the screw advancement needs. For instance, at least a portion of a buccal surface (30) may deviate from a constant sloping to increase a distance with respect to the insertion axis (A).

Figure 5:
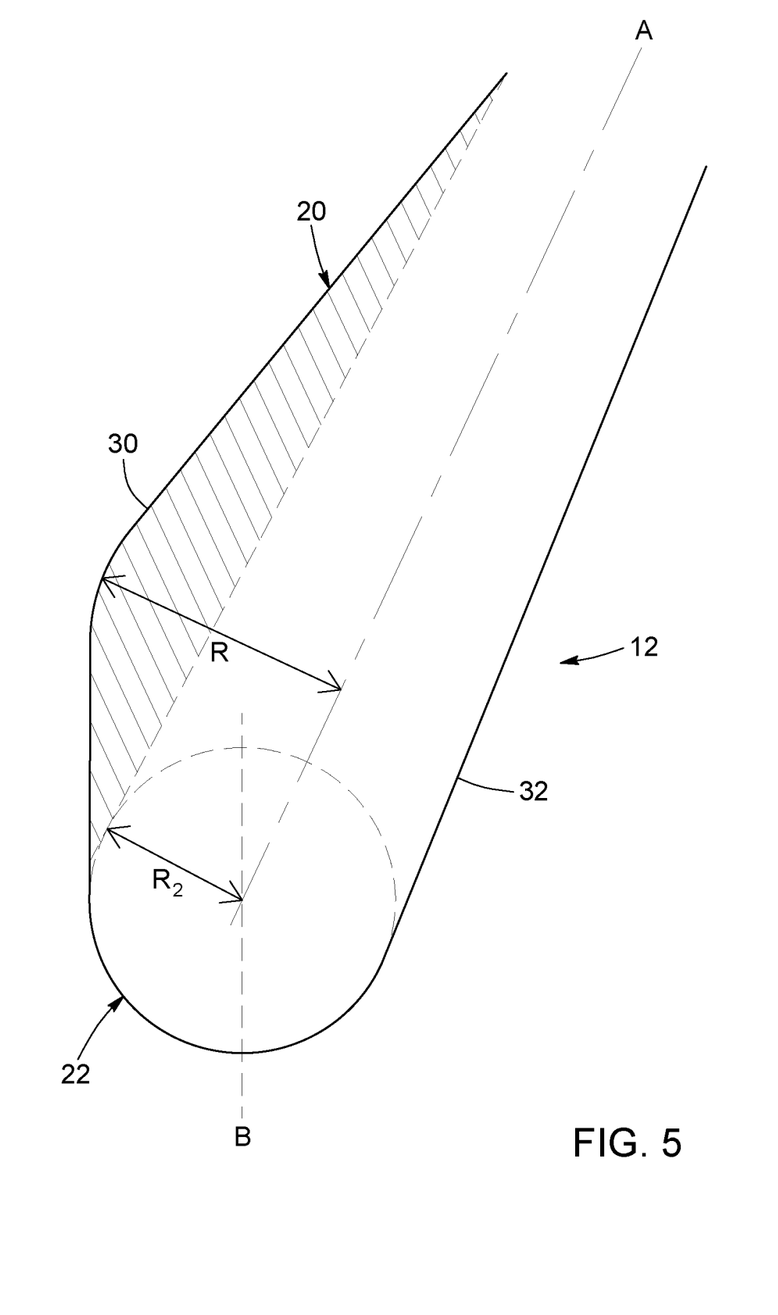
FIG. 5 is a schematic cross-sectional view of contours of a screw conduit designed to be formed within a dental superstructure.

Referring to FIGS. 5 and 7, the buccal surface (30) of the insertion portion (20) may be outwardly arched with respect to the insertion axis (A) such that a distance R between a point of the lingual surface and the insertion axis (A) is greater than a radius R2 (D2/2) of the angulation portion (22). It should be noted that the distance R is taken in a direction perpendicular to the insertion axis (A).

In some implementations, the insertion portion (20) may be deformed to reduce the dental superstructure mass loss while ensuring sufficient space for screw advancement. For instance, at least a portion of a lingual surface (32) may deviate from a constant sloping to increase a thickness of a buccal portion of the dental superstructure (2).

Figure 6:
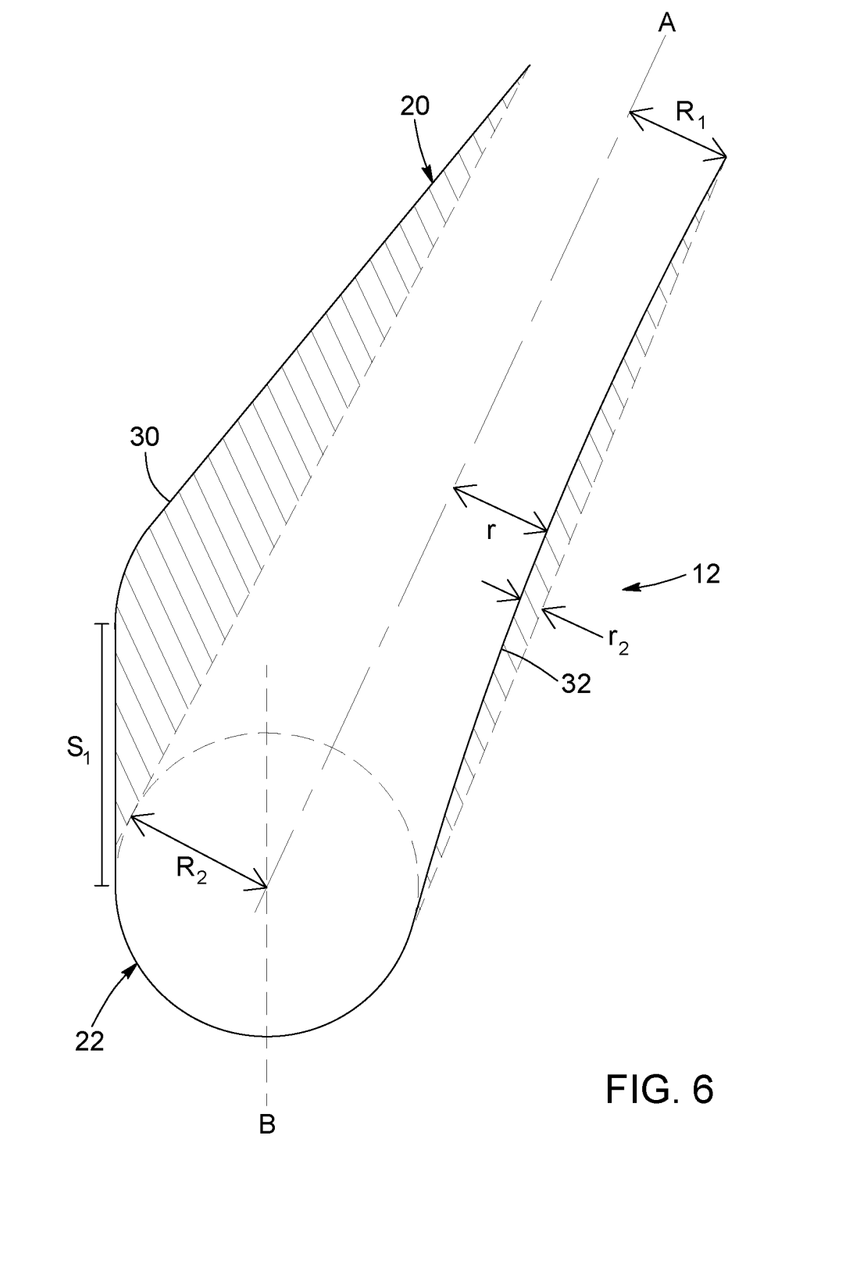
FIG. 6 is another schematic cross-sectional view of contours of a screw conduit designed to be formed within a dental superstructure.

Referring to FIGS. 6 and 7, a lingual surface (232) of the insertion portion (20) may be inwardly arched with respect to the insertion axis (A) such that a distance r between a point of the lingual surface (232) and the insertion axis (A) is lower than a radius R1 (D1/2) of the insertion portion (20). It should be noted that the distance r is taken in a direction perpendicular to the insertion axis (A).

It should be noted that the deformation of the lingual and/or buccal contour of the insertion portion may differ from the exemplary embodiments of FIGS. 5 to 7. For example, the lingual and buccal contour of the insertion portion may include an inflexion point at which the sign of the curvature (i.e., the concavity) changes. More particularly, the distance R may decrease from the R1 value in a downward direction along the insertion axis until reaching a buccal inflexion point from which the distance R increases until reaching its maximum value, corresponding to a maximum deviation from the insertion axis. Similarly, the distance r may increase from the R1 value in a downward direction along the insertion axis until reaching a lingual inflexion point from which the distance r decreases until reaching its minimum value, corresponding to a minimum deviation from the insertion axis.

Secondary Screw Conduit Implementations

As seen on FIG. 1, in some implementations, the path further defines a secondary screw conduit (15) extending from the screw abutment seat unto a distal end of the protruding dental abutment (4). The secondary screw conduit (15) is configured to communicate with an implant screw conduit (17) extending from the distal end of the dental abutment (4) downwardly into the jaw bone (not illustrated on Figures) and along the implant axis (B) to enable insertion and fixation of the screw (6). The dental superstructure (2) is snugly abutted against the protruding dental abutment (4) to put in communication the drop-shaped screw conduit (12), the secondary screw conduit (15) and the implant screw conduit (17) of the dental abutment (4). More particularly, when the dental superstructure (2) is engaged with the protruding dental abutment (4), a central axis of the secondary screw conduit (15) and the implant screw conduit (17) of the dental abutment (4) are substantially aligned.

More particularly, referring to FIG. 2, the base structure (10) of the dental superstructure (2) comprises a secondary abutment seat (24). The secondary abutment seat (24) defines an abutment recess (25) extending upwardly from a base portion of the base structure (10). The protruding dental abutment (4) is insertable in the abutment recess (25) with the secondary abutment seat (24) providing an abutment surface to the protruding dental abutment. The abutment recess (25) communicates with the secondary screw conduit (15) and, more particularly, when the protruding dental abutment (4) is inserted in the abutment recess (25) and abutted against the secondary abutment seat (24), the secondary screw conduit (15) is in communication with the implant screw conduit (17) of the dental abutment (4) to allow insertion of a screw therethrough.

It should be noted that although certain above-mentioned features of the dental superstructure may be described in the context of a single embodiment, the same features may also be provided separately or in any suitable combination of embodiments. Conversely, although certain above-mentioned features may be described herein in the context of separate embodiments for clarity, these features may also be implemented in a single embodiment. For example, the inwardly arched lingual contour may be used in combination with the secondary screw conduit implementations described above.

Method Implementations

In another implementation, there is provided a method to create an adequate path for a screw from an external surface of the dental superstructure towards the protruding dental abutment. The method includes designing the drop-shaped screw conduit to allow guidance and angulation of the screw.

Referring to FIG. 2, the method includes selecting a location for the inlet (16) of the conduit (12) on the exterior surface of the dental superstructure (2) so as to insert the screw (not illustrated on FIG. 2) along the insertion axis (A) at an a angle. As mentioned above, the method may include selecting the a angle so as to offer reduced visibility of the inlet of the conduit from outside of the oral cavity of a patient. Optionally, the angle α between the insertion axis and the implant axis may be between 0.1° and 25° depending on the type of tooth to be replaced and the size of adjacent teeth.

Still referring to FIG. 2, the method further includes designing the inlet (16) of the drop-shaped screw conduit (12) by selecting a first diameter (inlet diameter D1) in accordance with a diameter of the head (8) of the screw (6) to be inserted in the drop-shaped screw conduit (12) along the insertion axis (A). It should be noted that the first diameter D1 may be equal or superior to the diameter of the screw head (8). The first diameter D1 is taken in a direction perpendicular to the insertion axis and at an upper intersection (closer to a tip of the dental superstructure) with the inlet (16) within the base structure (4). Optionally, the first diameter D1 may be between 1 and 4 mm, further optionally between 2 and 3 mm, so as to receive typical dental abutment screws therethrough. It should be noted that the first diameter D1 may be referred to as a projected inlet diameter.

Still referring to FIG. 2, the method further includes designing the insertion portion (20) of the drop-shaped screw conduit (12). As mentioned-above, the insertion portion (20) extends conically downwardly and outwardly from the inlet such that the insertion portion has a varying diameter increasing from the projected inlet diameter value to a second diameter D2 (corresponding to the angulation diameter). The conic shape of the insertion portion (20) may ensure guidance for advancement of the screw along the insertion axis (A).

The method further includes designing the angulation portion (22) of the drop-shaped screw conduit (12) which extends from the insertion portion (20) such that a diameter thereof, taken at a proximal end of the insertion portion (20), corresponds to the angulation diameter D2 of the substantially spherical angulation portion (22). As the angulation portion (22) is configured to define a spherical space enabling angulation of the screw, the angulation portion has a substantially spherical contour. The spherical space is defined by the angulation diameter D2, which is selected to be larger than the first diameter D1 to allow angulation of the screw from the insertion axis (A) to the implant axis (B). Optionally, the angulation diameter D2 may be selected in accordance with the first diameter D1. Further optionally, the angulation diameter may be determined by the following equation (I):

$$D2 = D1 + x \qquad (I)$$

x is between 0 and 1.5. Optionally, x=1. Further optionally, x=0.75.

It should be understood that the spherical space refers to any space or contour which is able to enclose a sphere. Therefore, the angulation portion of the conduit can have spherical contour or comprises multiple adjacent surfaces oriented at varying angles to define a substantially spherical space therein.

Still referring to FIGS. 1 and 3, designing the angulation portion (22) also includes positioning an angulation center of the spherical space with respect to the dental superstructure (2) at the intersection of the insertion axis (A) and the implant axis (B). It should be noted that vertical dimensions may be selected to fulfill aesthetic requirements and the dental superstructure margins may be therefore located sub-gingivally. In addition, vertical dimensions may be selected to ensure mechanical stability of the screw when abutted to the screw abutment seat (14) and anchored within the adjacent secondary screw conduit (15) and implant screw conduit (17).

Referring to FIG. 2 for installation with a flat heat screw, the angulation center may be positioned on the implant axis (B) at an angulation height H2 which is greater than an abutment height H1. As better seen on FIG. 2, the abutment height H1 can be defined by the height at which the screw abuts to the screw abutment seat, and corresponding to the sum of the length L of the protruding dental abutment (4) contained in the base structure (10) of the dental superstructure (2) and the length l of the secondary screw conduit (15).

Referring to FIG. 3 for installation with a screw head (8) having a tapered seat, the angulation center may be positioned on the implant axis (B) at an angulation height H2 which is greater than a height H3. As better seen on FIG. 3, the height H3 can be defined by the sum of the height at which the screw abuts to the screw abutment seat (similar to H1) and the height of the tapered portion of the seat (14) (also corresponding to the height of the tapered seat head (8) of the screw (6)).

Given the geometry of the screw abutment seat, the angulation height H2 may be determined by different variations of a formula.

In some implementations, for a flat seat screw abutment seat as illustrated on FIG. 2, the angulation height may be determined according to formula (II) which is the following:

$$H2 + H1 + \frac{D2}{2} \qquad (II)$$

In other implementations, for a tapered seat screw abutment seat as illustrated on FIG. 3, the abutment height may be determined by the following formula (III):

$$H2 = H3 + \frac{D2}{2} \qquad (III)$$

In some implementations, the method may further include designing the screw abutment seat which is configured to receive the head of the screw in abutment thereto when inserted in the protruding dental abutment along the implant axis. Referring to FIGS. 2 and 4, the design of the screw abutment seat (14) includes selecting an abutment shape being substantially complementary with a shape of the head of the screw. For example, referring to FIG. 4, the method may include selecting a tapered shape for the recess of the seat (14) to complement the tapered seat head of the screw (not illustrated in FIG. 4). Referring to FIG. 1, the method may include selecting a flattened shape for the recess of the seat (14) to complement the flat seat head of the screw (6).

It should be understood that the design of the screw abutment seat may vary according to the screw head geometry and is not limited to the implementations illustrated on the Figures. Head geometries may include flat or tapered shapes.

In some implementations, referring to FIGS. 1 to 4, the method may also include designing the secondary screw conduit (15) which further defines the path for the screw within the base structure (10) of the dental superstructure (2) along the implant axis (B). The design of the secondary screw conduit (15) includes selecting a path diameter smaller than the angulation diameter of the drop-shaped screw conduit (12) and substantially equal to a diameter of the implant screw conduit (17), so as to be able to enclose shank and thread (26) of the screw. In an embodiment, the path diameter of the secondary screw conduit (15) is substantially equal to or slightly larger than the diameter of the shank of the screw.

In some implementations, referring to FIG. 4, the method may further include designing the secondary abutment seat (24) extending from the secondary screw conduit (15) and offering an abutment surface to the protruding dental abutment (not illustrated on FIG. 3). The design of the secondary abutment seat (24) may include selecting an abutment shape being substantially complementary with a shape of the protruding dental abutment. For example, as seen on FIG. 4, the secondary abutment seat (24) may extend substantially conically outwardly from the secondary screw conduit (15). Variations of design may occur to adapt to the geometry of the protruding dental abutment.

In some implementations, referring to FIG. 5, the method may further include adjusting a buccal surface (30) of the insertion portion (20) of the screw conduit (12), the adjustment comprising outwardly arching the buccal surface with respect to the insertion axis (A) such that a distance R between a point of the buccal surface and the insertion axis (A) is higher than a radius R2 (D2/2) of the angulation portion (22). The maximal value of the distance R depends on the size of the head of screw, the maximal value of the distance R remains constant for a same type of screw head. For example, a maximal value of the distance R may be 2 mm. The point of the buccal surface (30) at which the distance R reaches its maximum depends on the length of the screw to be inserted. As better seen on FIG. 6, it should be further noted that a portion $S_1$ of the buccal surface (30) remains parallel to the implant axis (B), the portion $S_1$ being a portion of the buccal surface (30) joining the point of the buccal surface (30) at which the distance R is maximal, and the point at which the buccal surface (30) reaches the angulation portion (22) of the screw conduit (12).

In some implementations, referring to FIG. 6, the method may further include adjusting a lingual surface (32) of the insertion portion (20) of the screw conduit (12), the adjustment comprising inwardly arching the lingual surface (32) with respect to the insertion axis (A) such that a distance r between a point of the lingual surface (32) and the insertion axis (A) is lower than a radius R1 (D1/2) of the insertion portion (20).

For example, the minimal value of the distance r may be:

$$r_m = (R_2 - R_1)/2 + R1 - r_2$$

wherein $r_m$ is the minimal distance r, R2 is the angulation radius, R1 is the inlet radius and $r_2$ is a constant selected according to a size and shape of the screw. For example, $r_2$ may be equal to 0.3 mm such that $r_m$=R1−0.05 mm.

It should be understood that the design of the drop-shaped screw conduit and the creation of the whole path for the screw through the base structure may be implemented within a dental superstructure by any manufacturing means and methods available to one skilled in the art.

It should be further understood that the above-described implementations of the drop-shaped screw conduit are not limited to a base structure as defined and illustrated herein. The drop-shaped screw conduit may be implemented in other types of superstructures including a base structure made of several parts (metallic frame, spacers, etc.)

It should be further understood that any one of the above mentioned optional aspects of the dental superstructure may be combined with any other aspects of the method, unless two aspects clearly cannot be combined due to their mutually exclusivity. For example, the various design steps of the method may be combined and adapted to any of the structural elements of the dental superstructure appearing herein and/or in accordance with the appended claims.

The invention claimed is:

1. A dental superstructure securable to a protruding dental abutment having an implant screw conduit defining an implant axis, the dental superstructure comprising a base structure mimicking a tooth and being perforated to create a path for a screw towards the protruding dental abutment, the path defining within the base structure a drop-shaped screw conduit having:
    an aperture defining an inlet on an external surface of the base structure to enable insertion of the screw into the drop-shaped screw conduit,
    an insertion portion extending conically outwardly from the inlet to enable advancement of the screw along an insertion axis,
    an angulation portion extending from and communicating with the insertion portion and having a spherical contour to allow angulation of the screw from the insertion axis to the implant axis, and
    a screw abutment seat extending from the drop-shaped screw conduit to receive the screw, the screw abutment seat being sized and configured to be abutted by a head of the screw inserted within the protruding dental abutment along the implant axis; and
    wherein the screw abutment seat defines an abutment shape being complementary with a shape of the head of the screw, the abutment shape being a tapered shape or a flattened shape.

2. The dental superstructure of claim 1, further comprising a secondary screw conduit extending downwardly from the screw abutment seat along the implant axis, the secondary screw conduit being in communication with the implant screw conduit extending from a distal end of the protruding dental abutment downwardly towards a jaw bone of a patient.

3. The dental superstructure of claim 2, further comprising an abutment recess extending upwardly from a base portion of the base structure up to the secondary screw conduit and defining a secondary abutment seat offering an abutment surface to the protruding dental abutment, the abutment recess being complementary in shape with a shape of the protruding dental abutment.

4. The dental superstructure of claim 1, wherein a distance R between a point of a buccal surface and the insertion axis, and taken perpendicularly to the insertion axis, has a maximum value in accordance with a head diameter of the screw, and wherein a location of the point of the buccal surface at which the distance R has the maximum value is in accordance with a length of the screw.

5. The dental superstructure of claim 1, wherein the insertion portion comprises a lingual surface which is inwardly arched with respect to the insertion axis to create an extended dental space for the dental superstructure.

6. The dental superstructure of claim 5, wherein a distance r between a point of the lingual surface and the insertion axis, and taken perpendicularly to the insertion axis, has a minimum value following the equation:

$$r_m = R_1 - 0.05 \text{ mm}$$

wherein $r_m$ is the minimal value of the distance r, and $R_1$ is a radius of the inlet of the screw conduit.

7. The dental superstructure of claim 1, wherein the base structure comprises a lingual external surface and the aperture of the inlet is located on the lingual external surface.

8. The dental superstructure of claim 1, wherein the insertion and the implant axes are aligned and the secondary and the implant screw conduits are concentric.

9. The dental superstructure of claim 1,
    wherein the inlet of the drop-shaped screw conduit has a first diameter D1 in accordance with a diameter of the head of the screw to be inserted in the drop-shaped screw conduit along the insertion axis; and
    wherein the angulation portion of the drop-shaped screw conduit defined by:
        a second diameter D2 larger than the first diameter D1 of the inlet to allow angulation of the screw from the insertion axis to the implant axis, and
        an angulation center positioned within the drop-shaped screw conduit at an intersection of the insertion axis and the implant axis.

10. The dental superstructure of claim 9, wherein the second diameter is determined according to the following equation (I):

$$D2 = D1 + x \quad \text{(I)}$$

wherein D2 is the second diameter in mm; and
wherein D1 is the first diameter in mm and x is between 0 and 1.5 mm.

11. The dental superstructure of claim 10, wherein x=0.75 mm.

12. The dental superstructure of claim 9, wherein the angulation center is positioned at an angulation height which is greater than an abutment height at which the screw abuts to the screw abutment seat of the dental superstructure, both the angulation height and the abutment height being taken with respect to a bottom surface of the base structure.

13. The dental superstructure of claim 12, wherein the angulation center is positioned at the angulation height being adapted for the head of the screw having a flat seat and being determined according to the following equation (II):

$$H2 = H1 + \frac{D2}{2} \quad \text{(II)}$$

wherein H2 is the angulation height; and
wherein H1 is the abutment height; and D2 is the second diameter of the angulation portion.

14. The dental superstructure of claim 12, wherein the angulation center is positioned at the angulation height being adapted for the head of the screw having a tapered seat and being determined according to the following equation (III):

$$H2 = H3 + \frac{D2}{2} \qquad (III)$$

wherein H2 is the angulation height; H3 is the sum of the abutment height and the tapered screw head height; D2 is the second diameter of the angulation portion and D1 is the first diameter in accordance to an inlet of the insertion portion.

15. The dental superstructure of claim 9, wherein the insertion portion comprises a buccal surface which is outwardly arched with respect to the insertion axis to define an extended angulation space for angulation of the screw, and to obtain a distance R which is higher than a radius R2 (D2/2) of the angulation portion, with the distance R being taken between a point of the buccal surface and the insertion axis (A), and perpendicularly to the insertion axis.

16. The dental superstructure of claim 9, wherein the insertion portion comprises a lingual surface which is inwardly arched with respect to the insertion axis to create an extended dental space for the dental superstructure and to obtain a distance r which is lower than a radius R1 (D1/2) of the insertion portion, with the distance r being taken between a point of the lingual surface and the insertion axis (A), and perpendicularly to the insertion axis.

17. An assembly for a dental implant, the assembly comprising:
   a dental superstructure securable to a protruding dental abutment having an implant screw conduit defining an implant axis, the dental superstructure comprising a base structure mimicking a tooth and being perforated to create a path for a screw towards the protruding dental abutment, the path defining within the base structure a drop-shaped screw conduit having:
      an aperture defining an inlet on an external surface of the base structure to enable insertion of the screw into the drop-shaped screw conduit,
      an insertion portion extending conically outwardly from the inlet to enable advancement of the screw along an insertion axis,
      an angulation portion extending from and communicating with the insertion portion and having a spherical contour to allow angulation of the screw from the insertion axis to the implant axis, and
      a screw abutment seat extending from the drop-shaped screw conduit to receive the screw, the screw abutment seat being sized and configured to be abutted by a head of the screw inserted within the protruding dental abutment along the implant axis, and
      wherein the screw abutment seat defines an abutment shape being complementary with a shape of the head of the screw, the abutment shape being a tapered shape or a flattened shape;
   an osseointegrable implant including the protruding dental abutment; and
   a dental abutment screw;
   the osseointegrable implant being securable to a jaw bone, and the dental superstructure being mountable about the protruding dental abutment by inserting the screw through the drop-shaped screw conduit of the dental superstructure and screwing the screw into the osseointegrated implant.

* * * * *